Aug. 27, 1957     R. PINTARELLI     2,804,286

RADIATION FINS

Filed March 18, 1955

INVENTOR.
Ralph Pintarelli
BY
Elliot A. Salter

United States Patent Office 2,804,286
Patented Aug. 27, 1957

2,804,286

RADIATION FINS

Ralph Pintarelli, Johnston, R. I.

Application March 18, 1955, Serial No. 495,209

1 Claim. (Cl. 257—262.16)

This invention relates generally to heating systems and more particularly to radiation fins for use with heating conduits.

In heating systems where the heating medium is carried by a conduit and the heat is exchanged directly from said conduit, it is of vital importance that the heat be rapidly and efficiently carried away from the conduit for dissemination to the area to be heated. Thus in rooms where the conduit extends within a baseboard enclosure, for example, it is necessary that steps be taken to keep the heat from stagnating adjacent the baseboard area. The prior art has partially solved this problem by the use of radiation fins of heat conducting material, mounted on the conduit in closely spaced relation. Although the radiation fins heretofore employed have greatly aided in the carrying off of heat from the conduit, there, nevertheless, still remains a relatively high degree of heat stagnation in the conduit area.

Accordingly, a primary object of this invention is the provision of novel and improved radiation fins which will result in a maximum of heat transfer from the conduit with which they are associated.

Another object is the provision of novel and improved radiation fins which will disseminate the heat with a relatively high degree of rapidity.

Still another object is the provision of radiation fins having means thereon for venting and otherwise providing impetus to the heated air adjacent the conduit in order to impel said heated air away from the conduit area.

A further object is the provision of radiation fins having novel and improved means for mounting on a conduit.

A still further object is the provision of novel and improved mounting means for radiation fins wherein said mounting means additionally aid in the achievement of maximum heat transfer.

Another object is the provision of novel and improved radiation fins which are simple to install, durable in use, and economically feasible to manufacture.

Other objects, features and advantages of the invention will become apparent as the description thereof proceeds when considered in connection with the accompanying illustrative drawings.

In the drawings which illustrate the best mode presently contemplated by me for carrying out my invention:

Figure 1:
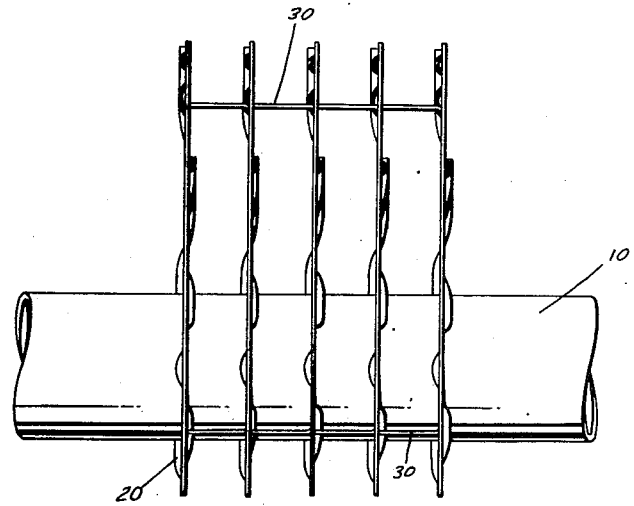
Fig. 1 is a side elevation of a conduit having a plurality of my novel and improved radiation fins mounted thereon.

Referring to the drawings, and more particularly to Fig. 1 thereof, a heat carrying conduit is shown at 10. The heating medium carried by conduit 10 may be of any known type, such as, for example, hot water or steam. A plurality of radiation fins 12 of any known heat conductive material, preferably copper, are mounted on the conduit 10 in spaced relation in order to aid in the carrying away and dispersement of heat from the conduit in a manner now to be described.

Figure 2:
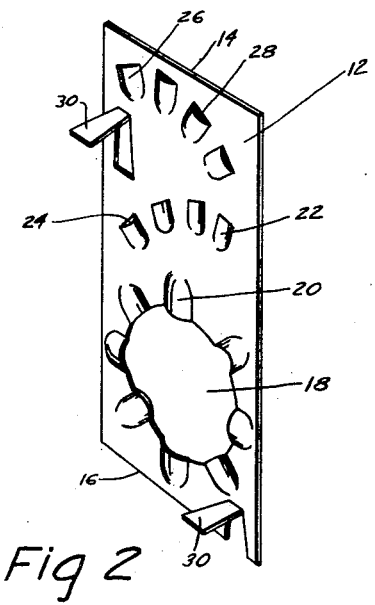
Fig. 2 is a perspective view of my novel and improved radiation fin.
Figure 3:
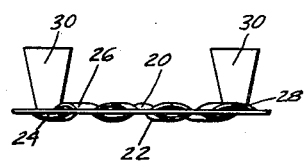
Fig. 3 is a top edge view thereof.

Each fin 12 (note Fig. 2) is of substantially rectangular configuration and has a top edge 14 and a bottom edge 16. The fin 12 is further provided with a circular aperture 18 located adjacent the bottom edge 16. Surrounding the aperture 18 are a plurality of dished projections 20, the functions of which will hereinafter be made apparent. The projections 20 are of substantially cup-shape configuration and each successive projection extends in an alternate direction.

Located above the aperture 18 is a series of additional dished projections 22, also of substantially cup-shape configuration. The projections 22 extend through an arcuate path and at their upper extremities define openings 24. Adjacent the upper edge 14 there is still another series of dished, cup-shape projections 26, defining at their upper portions openings 28. It will be noted that each of the projections 24 are dished in the opposite direction from that of the projections 26.

Integrally struck from diametrically opposed corners of the fin 12 are spacer legs 30, each of which tapers outwardly toward its free end. It will be understood that the legs 30 serve to keep the fins 12 properly spaced when a plurality of the fins are mounted on a conduit, as shown most clearly in Fig. 1.

In mounting the fins for use, the apertures 18 will snugly encompass the conduit 10, and the oppositely disposed projection 20 will provide supporting means for preventing canting of the fins. At the same time, the particular dished, cup-shape configuration of the projections 20 serves to provide a venting action on the hot air currents. This action is of great importance since it aids in the reduction of stagnation of the heat at the very area where it is most likely to occur, namely, adjacent the conduit. Thus the projections 20 not only simplify the mounting of the fins on the conduit by eliminating use of collars, spring fingers and the like as heretofore employed, but they additionally aid in the dissemination of the heat.

Due to the fact that the natural tendency of the heat is to rise, the aperture 18 of fin 12 is located near the lower edge 16 thereof, whereby the major portion of the fin is in the path of the heat flow. The projections 22 and 26 also serve to reduce stagnation of the heat between the fins by venting and otherwise inciting flow of the heated air. The fact that the elements 22 and 26 project from opposite sides of the fins aids in the more effective dissemination of the heated air while the openings 24 and 28 enable the heat to intersperse from opposite sides of any respective fin, thereby contributing to greater circulation thereof and hence to a more efficient heat transfer and exchange.

The spacer legs 30 form no part of the instant invention. It will be noted, however, that by use of the tapered construction shown and described, there will be no tendency for a plurality of the fins 12 to nest.

In use, radiation fins employing the aforedescribed construction have proven to be exceptionally effective. Tests have shown that by spacing these fins every half inch on the conduit, as much if not more heat will be disseminated and at a much more rapid rate than where prior art fins are mounted every quarter inch or closer.

Thus it will be seen that there is provided in accordance with this invention radiation fins comprising certain novel and inventive structural features which cooperate to provide an improved and more efficient heating system.

While there is shown and described herein certain specific structures embodying the invention it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim.

I claim:

In a heating system, a radiation fin of rectangular configuration having an aperture therein for the reception of a horizontally extending, heat carrying conduit, said aperture being located on the longitudinal center line of said fin but offset with respect to the transverse center line thereof whereby the major portion of the fin is adapted to be disposed above the conduit, a plurality of dished, elongated projections extending radially from said aperture and in communication therewith, said projections being disposed in circumferentially spaced relation and each successive one thereof extending in an alternate direction, and a plurality of additional dished, elongated projections formed in said major portion of the fin, some of said additional projections extending from one side of said fin, and others extending from the other side thereof, said additional projections each having an opening at its upper extremity.

References Cited in the file of this patent

UNITED STATES PATENTS

| 1,797,535 | Trane | Mar. 24, 1931 |
| 1,873,052 | Seward | Aug. 23, 1932 |
| 2,217,469 | Clarke | Oct. 8, 1940 |
| 2,696,976 | Boestad et al. | Dec. 14, 1954 |

FOREIGN PATENTS

| 33,595 | France | July 3, 1928 |
| | (Addition to No. 603,073) | |
| 72,371 | Austria | Sept. 11, 1916 |